United States Patent [19]

Meyer, Jr.

[11] 4,389,789
[45] Jun. 28, 1983

[54] CONTRACTING MICROMETER RING GAGE ASSEMBLIES

[75] Inventor: Franklin Meyer, Jr., Forestdale, R.I.

[73] Assignee: Comtorgage Corporation, Slatersville, R.I.

[21] Appl. No.: 314,984

[22] Filed: Oct. 26, 1981

[51] Int. Cl.³ .............................................. C01B 3/34
[52] U.S. Cl. .............................. 33/178 R; 33/147 F; 33/174 Q
[58] Field of Search ............ 33/147 K, 143 R, 178 R, 33/147 H, 147 F, 147 M, 148 R, 148 E, 148 F, 149 R, 174 Q, 178 D, 199 R

[56] References Cited

U.S. PATENT DOCUMENTS

| | | | |
|---|---|---|---|
| 1,633,807 | 6/1927 | Darlington | 33/178 R |
| 2,424,497 | 7/1947 | Nilsson | 33/178 R |
| 2,472,875 | 6/1949 | Adams | 33/147 K |
| 2,563,984 | 8/1951 | Witchger | 33/178 R |
| 2,663,942 | 12/1953 | Rudolph | 33/178 R |
| 3,940,856 | 3/1976 | Meyer, Jr. | 33/178 R |

Primary Examiner—Willis Little
Attorney, Agent, or Firm—Maurice R. Boiteau

[57] ABSTRACT

There is disclosed in the present application, a ring gage assembly comprising two interdigitated measuring elements slidably mounted and urged toward each other to embrace an external, generally cylindrical surface of a workpiece to provide a precise measurement of the dimension of the surface. For this purpose, the ring gage assembly is detachably mounted on a known amplifier-/indicator device which includes mechanical amplification of the expansion and contraction of the ring gage and an indicator upon which there is shown by a pointer any deviation from the basic size of the dimension being measured at any given time by the ring gage. The ring gage assembly is coupled to the amplifier/indicator by a tapered plunger which enters a split socket in the measuring elements and, by being pressed into the socket, causes measuring surfaces of the two elements to approach each other and cooperates with the amplifier in magnifying pointer motion at the indicator for a given expansion or contraction of the ring gage.

9 Claims, 9 Drawing Figures

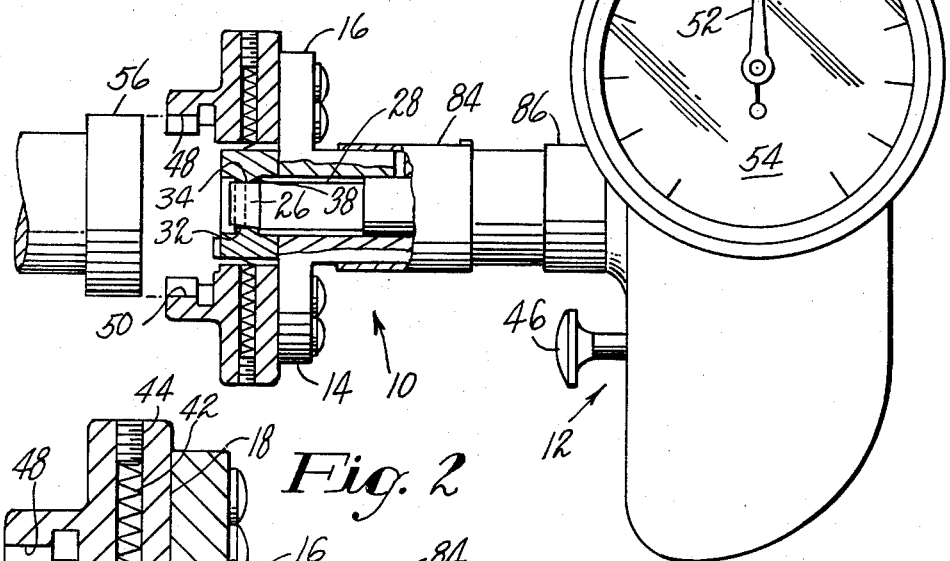
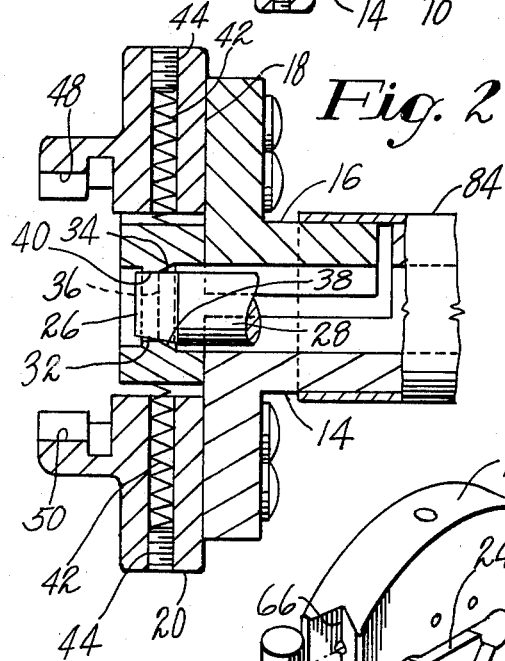
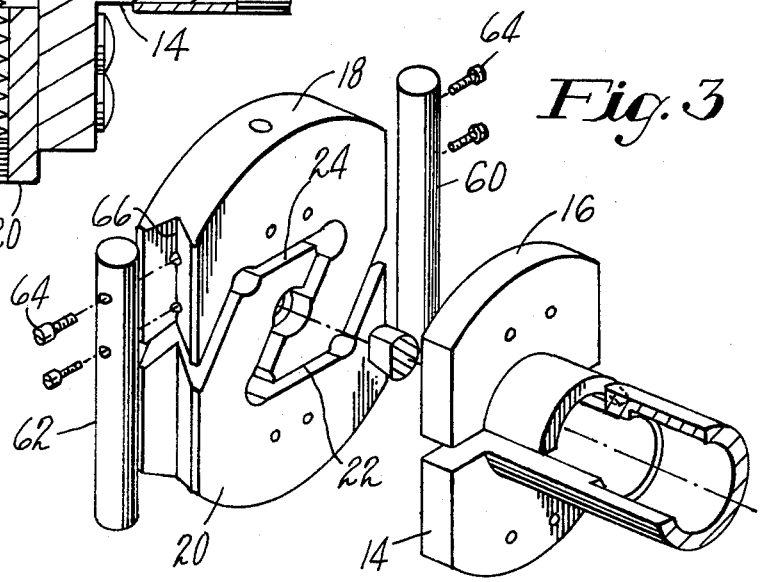

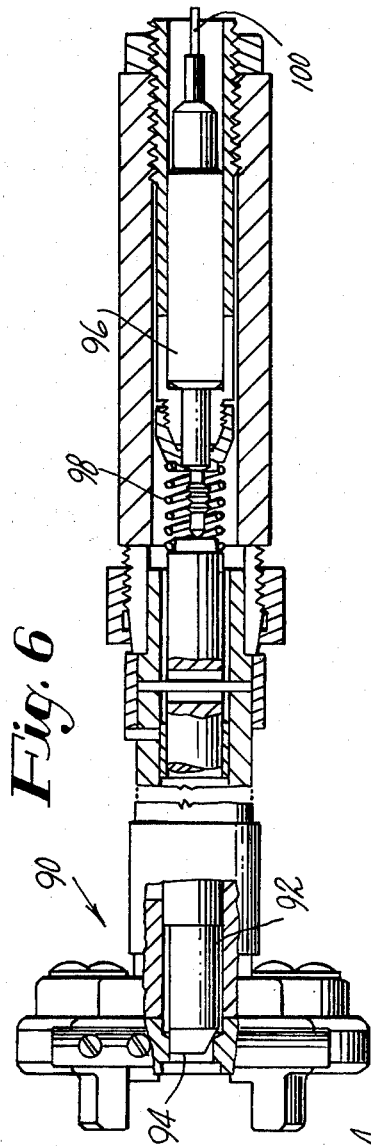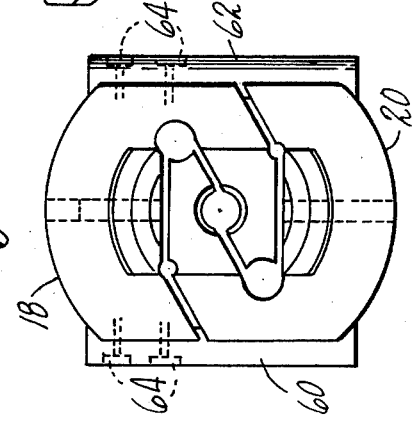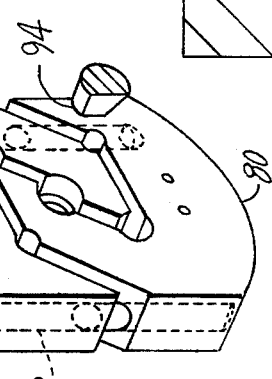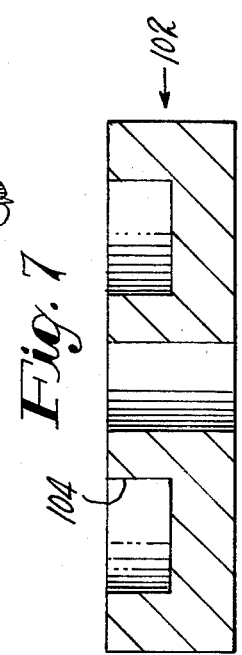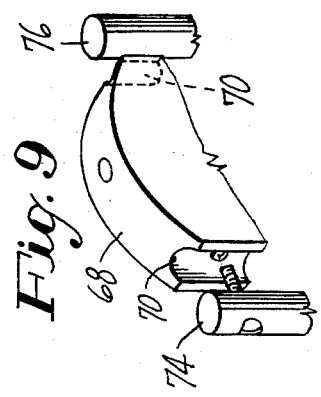

CONTRACTING MICROMETER RING GAGE ASSEMBLIES

The present application relates generally to improvements in ring gages, but more particularly to such gages which are intended to be detachably coupled to amplifier/indicator devices, herein sometimes referred to simply as amplifiers, and each device including a pointer to indicate on a dial any deviation from a basic dimension, in the size of a workpiece being measured.

It is frequently either necessary or highly desirable during precise metal cutting operations to determine as closely as possible, the exact size of an external diameter or other external dimension which is not readily accessible for measurement with general purpose instruments. Under such conditions, it is often possible to employ a gage such as that disclosed in U.S. Pat. No. 3,940,856 issued in my name on Mar. 2, 1976. This prior gage, while adequate for many purposes, suffers from limitations which tend to limit its general utility. One such limitation is the relatively high cost of manufacture resulting from the fact that the body of the gage including an integral hinge is a complex specialized unitary member requiring a high degree of precision in order to obtain the necessary accuracy.

Another limitation of my prior gage for certain applications, is the general lack of parallelism between opposed measuring surfaces. Because the measuring surfaces pivot in an arc about a remote hinge in such a gage, it is only possible for the gaging surfaces to be parallel at a single measurement. In practice, such gages are designed to measure in the plane of the leading edge of the measuring surfaces, effective relief being obtained by back tapering, that is, increasing the distance between measuring surfaces away from the leading edges, throughout the normal measuring range.

From the foregoing, it will be appreciated that a general object of the present invention is to obtain improved accuracy in the measurement of certain inaccessible dimensions in workpieces.

Another object is to achieve greater overall economy in the manufacture and use of indicating ring gage assemblies.

Still another object is to improve the precision and durability of indicating ring gage assemblies.

In the achievement of the foregoing objects, a feature of the invention relates to a slide connection for two separate but interdigitated measuring members of a ring gage assembly, adapted to embrace a workpiece and to cooperate with an amplifier to provide an accurate indication of the size of the workpiece. The interdigitated relationship of the measuring members together with the slide connection retains the two members together and also limits the degree of relative motion of the two members toward and away from each other.

According to a related feature, one of the measuring members is typically secured to a flanged end of an elongated body which is fixedly received in an appropriate socket in the amplifier and the other measuring member is fastened to a comparable end flange of a slide. The measuring members are urged toward one another by the tapered end of a plunger which couples the ring gage assembly to the amplifier. The plunger end is tapered and spring pressed into a socket formed partly in each of the two measuring members. By the spring pressure of the plunger end into the socket, the two members are caused to move relatively closer to each other against the force of other springs which tend to separate the measuring members in the absence of pressure from the plunger.

The foregoing objects and features will be more fully understood and appreciated from the following detailed description of an illustrative embodiment of the invention taken in connection with the accompanying drawings in which:

FIG. 1 is a view in side elevation of a ring gage assembly according to the present invention shown mounted on an amplifier/indicator device;

FIG. 2 is a fragmentary view on an enlarged scale and partly in cross section depicting a central portion of the ring gage assembly shown in FIG. 1;

FIG. 3 is a view in perspective of some of the parts of the ring gage assembly depicted in FIGS. 1 and 2, with the parts shown in separated relationship;

FIG. 4 is a view in front elevation of the gage assembly depicted in the previous Figures;

FIG. 5 is a plan view of the forward end of the gage assembly depicted in FIG. 4, with slide elements omitted for clarity;

FIG. 6 is a view in side elevation and partly in cross section, showing a ring gage assembly fitted with an electronic transmitter for coupling the assembly to an electronic amplifier/indicator;

FIG. 7 is a view in cross section of a typical part which may advantageously be measured with a ring gage assembly according to the present invention; and FIGS. 8 and 9 are fragmentary views in perspective showing alternative slide arrangements for ring gage assemblies.

Turning now to the drawings, there is shown, particularly, in FIG. 1, a ring gage assembly indicated generally at 10, mounted on an amplifier/indicator, shown generally at 12. The amplifier 12 is of the same type as that shown in my prior patent, including the direction of graduations, plus in the counter-clockwise direction from a central zero and minus in a clockwise direction from the zero.

The assembly 10 comprises a flanged gage body 14 which is received in an appropriate socket in the amplifier 12. As also shown in FIGS. 2 and 3, there is slidably connected to the body 14, a similarly flanged segment 16, which, together with the body, serves as a mounting for a pair of measuring members 18 and 20, fixedly secured respectively to the flanges of the segment and the body by screws and dowels. The measuring members 18 and 20, which are respectively movable and fixed, are shaped with respective interdigitated central projections 22 and 24 in each of which there is formed approximately half a socket entered by a tapered tip 26 of a coupling plunger 28. The tip 26 is formed with one conical taper 32 and a cylindrical or straight surface 34 parallel to the axis of the plunger, both of which enter the socket under spring pressure supplied by the amplifier 12. The action of the plunger is thus to press the segment 16 and the member 18 away from the body 14 and the member 20 while the plunger 28 which is guided in the body and coupled to the amplifier remains concentric with the body. For this purpose the taper 32 engages an edge 36 defined by the intersection of a cylindrical bore with a conical relief 38 in the projection 22 while the straight surface 34 is in contact with a cylindrical bore 40 in the projection 24.

In the absence of pressure from the plunger 28, the member 18 and the segment 16, under the urging of a pair of weak compression springs 42, move away from the body 14 and the member 20 to the extent permitted by the spacing of the interdigitated projections 22 and 24 and the slide connection to be described. Each of the springs 42 is interposed in an opening in one of the measuring members between a set screw and the projection of the opposite member. Thus, when the plunger is withdrawn from the socket by depressing a trigger 46 on the amplifier 12, the measuring member 18 and the segment 16 move away from the body 14 and the member 20. This produces a separation of measuring surfaces 48 and 50 which are integral respectively with measuring members 18 and 20. When the measuring surfaces are separated, the ring assembly 12 may readily be slipped axially over the end of a dimension, usually a diameter, to be measured. However, under the force of the spring pressure from the amplifier when the trigger 46 is released, the measuring surfaces 48 and 50 tightly embrace the workpiece and a pointer 52 indicates any deviation from the basic dimension on a dial 54. The amplifier is calibrated by applying the measuring surfaces 48 and 50 to a master 56, shown in FIG. 1, sized to the basic dimension to be measured, and adjusting the dial 54 to indicate zero.

There are shown in the drawings, three alternative forms of slide connections for mounting movable segments and measuring members on gage bodies, each having advantages and disadvantages, so that each is, in effect, limited for practical reasons, to a certain range of applications, as will now be seen. In terms of ease of manufacturing, the preferred construction is that depicted in FIGS. 3 to 5, which includes a pair of rolls 60 and 62 each secured by a pair of screws 64, to the measuring member 18. Each of the rolls 60 and 62 is fixedly received in a Vee groove 66 accurately machined in each lateral edge of each of the measuring members 18 and 20. As seen in the drawings, the rolls 60 and 62 are affixed to the member 18 only and the slide connection is obtained by slightly reducing the diameter of that part of the rolls engaging the grooves in the member 20. This form of construction, while simpler and more economical to manufacture than the other forms to be described sometimes suffers inaccuracies caused by misalignment under conditions of rough usage especially when the dimension being measured or its depth is especially great.

An alternative construction which has proven satisfactory for an intermediate range of sizes and depths of measurements is that depicted in FIG. 9. According to this construction, the Vee grooves 66 of the previously described construction are replaced in a movable member 68 and in a matching member (not shown), by semicylindrical grooves 70 to which rolls 74 and 76 are fitted. The accurate machining of the semi-cylindrical grooves 70 to fit the folls 74 and 76 as closely as possible, presents somewhat greater difficulties than are encountered in the machining of the Vee grooves 66, but the semi-cylindrical seats for the rolls offer superior resistance to misalignment under rough usage conditions while measuring an intermediate range of workpiece dimensions and depths. It will, of course, be understood that, in the construction depicted in FIG. 9, only the relationship of the rolls and grooves in the measuring members have been changed from the design already described in connection with FIGS. 1 through 5 and that the remaining construction remains otherwise unchanged.

A third design of the slide connection for a movable measuring member 78 on a stationary member 80 is shown in FIG. 8 and consists of a pair of spaced apart parallel pins 82 and 84 mounted in aligned bores in the two members. The pins 80 and 82 are fixed in the member 78 and are a slip fit in the member 80. This construction, which is unchanged from the designs previously described except in the construction of the slide connection, is preferable for assemblies intended for a larger range of measurements of both dimension and depth. As a disadvantage, it sometimes requires a slightly thickened measuring member body to accommodate the bores for the parallel pins which also require great cre in their precise machining and fitting to achieve optimum performance. In addition, the increase in thickness may also objectionably increase the weight of the combined amplifier and ring gage assembly.

In the above described ring gage assemblies, the deviation from the basic size of the measured dimension is indicated by a pointer 52 on a dial 54 forming a part of the amplifier 12, to which the gage assembly 10 is coupled. Except for details of the slide connections, which may vary in accordance with the requirements already described, the various illustrative examples are generally comparable in construction, each including a shield sleeve 84 loosely fitted to the body 14 and segment 16 behind their flanges and a locating bushing 86 as best seen in FIG. 1. Those ring gage assemblies intended for use with an amplifier 12, include a tapered plunger tip, the taper angle of which is inversely proportional to the amplification obtained by the combination of the ring gage assembly and the amplifier. Because the socket in the measuring members adapts readily to different taper angles different amplification factors may be obtained by substituting a plunger with a different taper angle to its tip. Thus it is possible to use the same basic gage assembly and master but with different plungers to measure the same basic dimension but with different tolerance bands. The amplifiers for the different tolerance bands are alike in construction but are provided with appropriate dials to provide greater or lesser full scale graduations in accordance with the requirements of the tolerance band to be measured and the taper angle of the plunger tip.

There is shown in FIG. 6, a ring gage assembly indicated generally at 90 which is coupled to an electronic amplifier/indicator of the type disclosed in prior U.S. Pat. No. 4,067,114 issued in my name on Jan. 10, 1978 for Improvements in Variable Amplification Expanding Plug Gages. The assembly 90 includes a plunger 92 having a tapered tip 94 which performs the function of closing the ring assembly around a workpiece, but, unlike the plunger 28, does not contribute to the amplification for indication on a display device. In the case of the assembly 90, the plunger 94 is formed with a much greater included angle of the tapered tip so that each expansion of the diameter of the ring assembly produces an equal axial motion of the plunger 92. For amplication, the plunger 92 is engaged by a sensor tip of a transducer 96. The tip 94 is pressed into the socket in the ring by a compression spring 98 interposed between the transducer and the end of the plunger which is contacted by the sensor tip. The transducer 96 is connected by a cable 100 to an amplifier indicator, not shown but essentially like that disclosed in my prior U.S. Pat. No. 4,067,114.

In FIG. 7 there is shown a typical condition in a workpiece indicated generally at 102 in which a diameter 104 is to be measured quickly and accurately as one of a very large number of mass produced parts. It will be appreciated that the present ring gage assembly is not limited in its applications to the measurement of diameters located within recesses affording limited lateral clearance. However, under such challenging conditions, the present gage assembly provides fast, accurate and reliable measurements of many forms of workpieces which, by their shapes, present substantial difficulties in approaching the surface whose dimension is to be measured.

From the foregoing description of illustrative embodiments, many variations within the scope of the present invention will become immediately apparent to those of ordinary skill in the metrology art. For example, some may wish to adapt the gage assembly to a form of indicator other than the amplifier/indicator suggested in this specification. Others, may modify the basic slide connections of the present disclosure with alternatives which they consider equivalent. It is accordingly, not intended that the foregoing description and the accompanying drawings be taken by way of limitation but rather that the scope of the invention be interpreted in terms of the appended claims.

Having thus disclosed my invention, what I claim as new and desire to secure by Letters Patent of the United States is:

1. A ring gage assembly adapted to be coupled to an indicating device, comprising a pair of separate but relatively movable interconnected gaging members each having a measuring surface remote from the indicating devices and each including a projection in a plane located between the indicating device and the measuring surfaces, each projection being interdigitated with the similar projection on the other gaging member and also including an indentation forming with a corresponding indentation in the opposite projection a generally central socket, a spring-pressed plunger having a tapered tip normally urged into engagement with the socket to cause the measuring surfaces to approach each other in embracing relationship with a workpiece and means for coupling the plunger to the indicating device.

2. A ring gage assembly according to claim 1 further characterized in that the tapered tip includes a cylindrical surface and a conical surface in engagement with the socket.

3. A ring gage assembly according to claim 2 further characterized in that the socket is defined by the intersection of cylindrical and conical clearance surfaces.

4. A ring gate assembly according to claim 1 further comprising a gage body disposed, while the assembly is in use, in fixed relation with the indicating device and upon which a first one of the gaging members is fixedly supported and a slide connection for the other gaging member on the first.

5. A ring gage assembly according to claim 4 further comprising a flange on the distal end of the body and a similarly flanged segment, to the flanges of which the gaging members are fixedly secured.

6. A ring gage assembly according to claim 4 further characterized in that the plunger is slidable in generally co-axial alignment with the body and is formed at its tip with a cylindrical surface engaging the socket in the first member and a conical surface engaging the socket in the other member.

7. A gaging instrument comprising a ring gage assembly including a pair of separate but relatively movable interconnected gaging members each having a measuring surface at one end and each including in an intermediate plane a projection interdigitated with a similar projection on the other member and also including an indention forming with a corresponding indentation in the opposite projection a generally central socket, a spring-pressed plunger having a tapered tip normally urged into engagement with the socket to cause the measuring surfaces to approach each other in embracing relationship with a workpiece, in combination with an amplifying and indicating means remote from the measuring surfaces upon which the assembly is detachably mounted and to which the plunger is coupled.

8. A gaging instrument according to claim 7 further comprising a slide connection between the two members.

9. A gaging instrument according to claim 7 further comprising a body received in the amplifying and indicating means and a movable segment, the plunger tip being formed with a cylindrical surface engaging the socket in the body-mounted member and with a conical surface engaging the socket in the segment-mounted member.

* * * * *